United States Patent Office 3,367,504
Patented Feb. 6, 1968

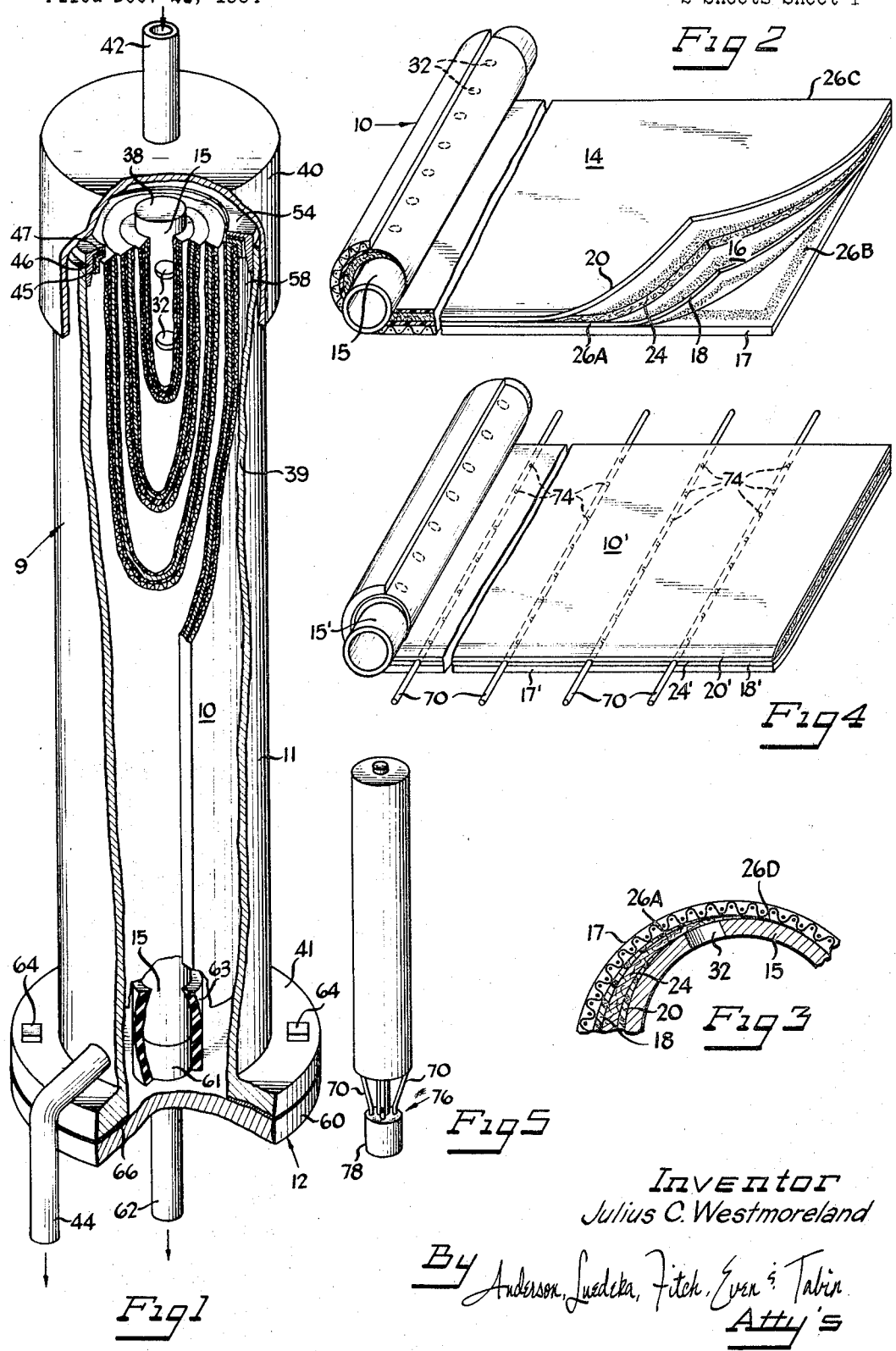

3,367,504
SPIRALLY WRAPPED REVERSE OSMOSIS
MEMBRANE CELL
Julius C. Westmoreland, La Jolla, Calif., assignor, by mesne assignments, to Gulf General Atomic Incorporated, San Diego, Calif., a corporation of Delaware
Filed Dec. 21, 1964, Ser. No. 419,881
1 Claim. (Cl. 210—321)

ABSTRACT OF THE DISCLOSURE

A reverse osmosis separation apparatus employing an envelope of semipermeable membrane sheets spaced apart by a layer of porous backing material and spirally wound with a continuous length of separator grid material about a hollow mandrel. An aqueous feed solution is introduced through the separator grid material, permeated water passes through the membranes and into the backing material by reverse osmosis, and the backing material discharges the permeated water into the hollow mandrel. Porous walled tubes are provided in the membrane envelope and serve as further discharge passageways for the permeated water.

---

This invention resulted from work done under contract No. 14-01-0001-250 with the Office of Saline Water in the Department of the Interior, entered into pursuant to the Saline Water Act, 42 U.S.C. 1951–1958g.

The present invention relates to a purification process and apparatus, and, more particularly, relates to an improved process and apparatus for purifying or concentrating a desired product. While the present process and apparatus has broad applicability, it is particularly useful in desalinating brackish water or sea water.

The desirability of obtaining potable water from brackish water or sea water has long confronted mankind, and is becoming increasingly important as available reserves of fresh water dwindle. The possibility of converting previously arid desert regions into productive areas by providing suitable fresh water supplies would be a notable achievement.

Various means for desalinating brackish water or sea water have been proposed or attempted. Evaporation processes have been used for this purpose, but have generally proven uneconomical for most purposes. Solar distillation methods generally require large structures, which are quite expensive. Various electrical methods of purification based on ion removal procedures have also been attempted, but generally have not been economical for desalination of sea water. Methods utilizing the principles of osmosis have not been attempted on any substantial scale.

It is an object of the present invention to provide improved apparatus for purifying or concentrating a desired product.

Another object of the present invention is the provision of an improved apparatus for the purification of water utilizing the principles of osmosis.

It is a further object of the present invention to provide apparatus for the recovery of purified water from saline water by reverse osmosis.

It is another particular object of the present invention to recover purified water from brackish water or sea water or to concentrate a desired product by employing the principle of reverse osmosis and utilizing a semipermeable membrane module having a large surface to volume ratio.

It is still another particular object of the present invention to recover purified water from brackish water or sea water or to concentrate a desired product applying the principle of reverse osmosis and employing a modular membrane structure which is easily replaceable at minimum expense.

Other objects and advantages of the present invention will become apparent from the following detailed description when considered in conjunction with the accompanying drawings wherein:

FIGURE 1 is a perspective view, partly broken away, of one embodiment of a purification unit in accordance with the present invention;

FIGURE 2 is a perspective view of a membrane layup as seen during fabrication of a membrane module of the purification unit of FIGURE 1;

FIGURE 3 is an enlarged fragmentary cross-sectional view of the membrane layup of FIGURE 2;

FIGURE 4 is a perspective view of an alternate embodiment of a membrane layup and its membrane module in an early stage of construction in accordance with the present invention; and FIGURE 5 is a perspective view of the completed membrane module of FIGURE 4 and of its connections.

Figure 6:
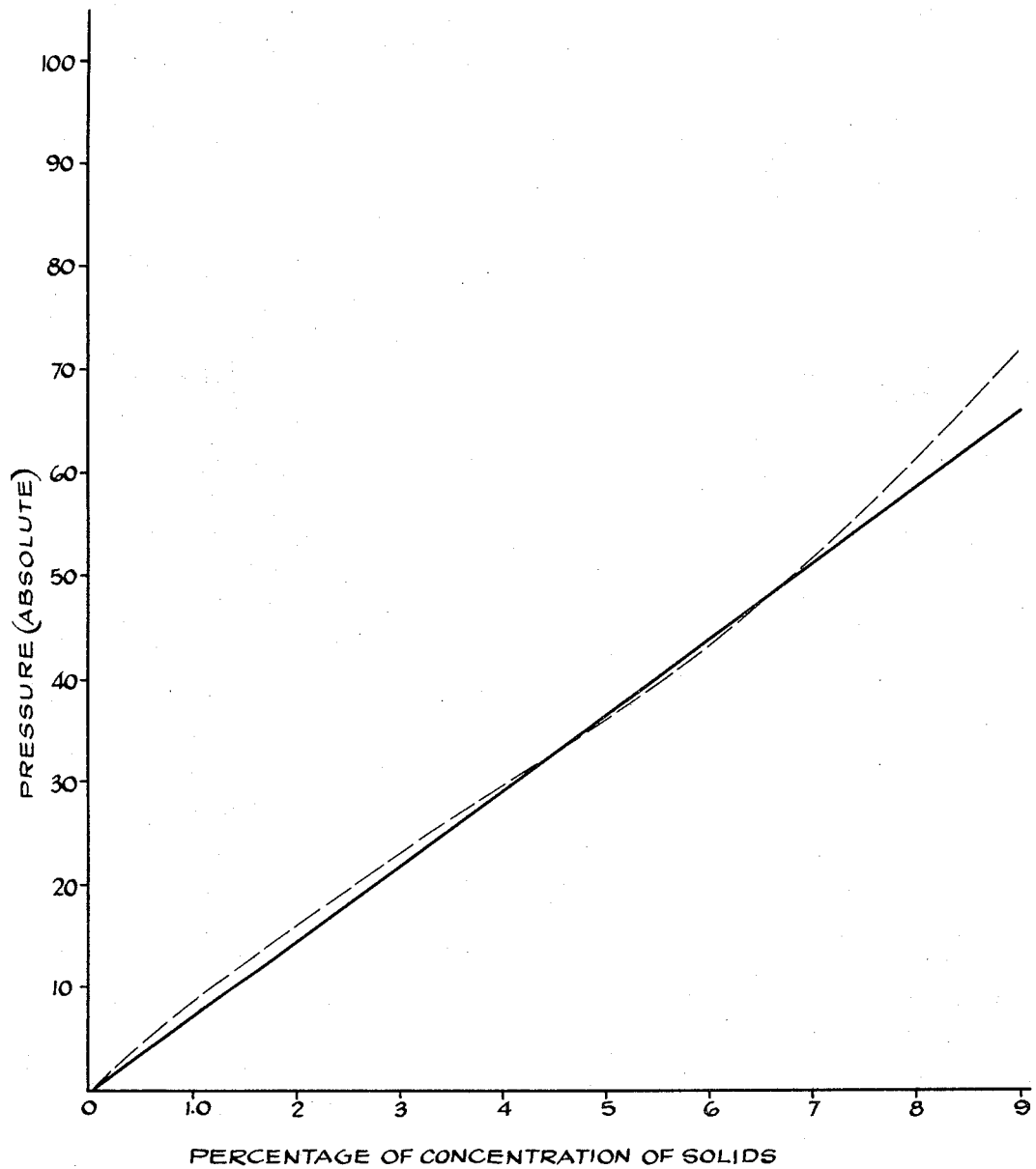
FIGURE 6 is a graph of osmotic pressure against percentage of concentration of solids for ordinary sea water.

In accordance with the present invention there are provided a method and apparatus for the economical recovery of purified water from brackish water or from sea water in commercial quantities. The method and apparatus employ the phenomenon known to those skilled in the art as reverse osmosis.

Osmotic processes are well known. Osmosis comprises the diffusion which proceeds through a semi-permeable membrane, typically separating two solutions, which tends to equalize the concentration of the solutes in each solution. An ideal semi-permeable membrane may be defined as a membrane having a finite permeability for one component of a solution, for example, water, while remaining totally impermeable to another component in the solution, for example, sodium chloride. Typically, in the process of osmosis, pure water diffuses from a first solution having a lower solute concentration through the membrane into a second solution having a higher solute concentration.

It is possible to restrain diffusion of the pure water through the membrane by maintaining the second solution (which has the higher solute concentration), at an elevated pressure with respect to the pressure conditions of the first solution. The particular pressure at which diffusion through an ideally semi-permeable membrane into the second solution is substantially retarded or halted is known as the osmotic pressure.

If the pressure applied to the second solution is further increased above the osmotic pressure of the second solution, a reverse diffusion occurs and water diffuses through the membrane into the first solution, which is known as reverse osmosis. The particular pressure required to bring about reverse osmosis varies in accordance with the particular solutions disposed on opposite sides of the semi-permeable membrane.

Osmosis and reverse osmosis can also be effected between a solution and a gaseous environment, such as air. If ordinary sea water is disposed on one side of an appropriate semi-permeable membrane, with a gaseous atmosphere on the other side, and the sea water is subjected to a pressure of approximately 350 pounds per square inch absolute (p.s.i.a.), reverse osmosis begins to occur, resulting in diffusion of pure water through the membrane. A graph of osmotic pressure against percentage of solids concentration for ordinary sea water is shown in FIGURE 6. This method of obtaining pure water from sea water has been proposed as an emergency means for obtaining small quantities of potable water in the event of shipwreck, as disclosed in United States Letters Patent No.

3,060,119. However, the method and apparatus disclosed in that patent are not suitable for recovery of purified water in an amount suitable for any purpose other than emergency situations. In this connection, and as previously noted, there has not heretofore been any commercial utilization of reverse osmosis methods of purifying sea water.

In accordance with the present invention, and with reference to FIGURE 1 of the drawing, there is provided a water purification unit 9 which includes a membrane module 10, a casing 11 for containing the module, and a product water takeoff assembly 12.

FIGURES 2 and 3 disclose the features of the membrane module 10 and its method of fabrication with particularity. The module 10 includes a central mandrel or tube 15, on which a membrane layup 14 comprising an envelope 16 and a separator grid 17 are spirally wound. The envelope 16 comprises a first semi-permeable membrane 18, a second semi-permeable membrane 20, and a layer of backing material 24. The separator grid 17 is disposed adjacent the first semi-permeable membrane 18 in the membrane layup 14 (FIGURES 2 and 3) but when the layup is wound on the tube 15 to provide the finished membrane module 10 (FIGURE 1) it will be seen that it lies adjacent both semi-permeable membranes 18 and 20. The first and second membranes 18 and 20 are suitably bonded together to provide a fluid-tight seal along three edges 26a, 26b, 26c, to thereby provide the envelope 16, but the fourth edge 26d is left unsealed for bonding to the tube 15.

The semi-permeable membranes 18 and 20 comprising the envelope 16 are generally in the form of thin sheets of a material having predetermined permeation properties. For efficient operation, the membrane sheets 18 and 20 are fabricated of such a material which exhibits substantial salt rejection properties. One such material comprises cellulose acetate.

Certain other polymeric materials, which exhibit salt rejection properties, have also been developed, which, however, may result in substantially lower rates of flow of purified water than is possible when cellulose acetate membranes are used. One such material is a copolymer of methyl vinyl ether and maleic anhydride which copolymer is mixed with polyvinyl alcohol. Another such material is polyvinyl methyl ketone. Both such materials normally are carried on a sheet of cellophane.

The backing material 24 is preferably such that it can withstand substantial applied pressures without collapse or undue creep. The backing material 24 should also have sufficiently high porosity so that substantial pressure drops do not result from flow of product water therethrough, as is subsequently explained in detail.

In some instances, cotton or wool felt may serve as the backing material 24. If a system is to be employed where pressures not in excess of 500 p.s.i.a. are generally encountered, various fibrous plastic materials may advantageously be utilized as the backing material 24. For this purpose many fibrous plastics such as nylon, polyester, rayon, rayon viscose or acrylic fibers which are unaffected by exposure to process fluids and are adaptable to wetting by a suitable adhesive may be used.

It has generally been found that particular fibrous plastic materials may not be used when it is anticipated that the pressure maintained in the purification unit 9 will exceed approximately 500 pounds per square inch. Since pressures ranging up to about 1500 p.s.i.a. are contemplated, it may be desirable to employ a relatively incompressible type of material such as glass cloth, or sand which has been screened to proper mesh sizes.

As previously indicated, the backing material 24 provides a flow channel for product water. The separator grid 17, on the other hand, provides a flow passageway for water to be purified. As illustrated in FIGURES 2 and 3, the separator grid is spirally wound on the tube 15 with the envelope 16 to provide a separation between successive spiral layers of the envelope 16 on the module 10. In this connection it is also possible in some cases to obtain more efficient operation of the purification unit by introducing the feed water through an inlet tube (not shown) which extends into the spiral windings of the separator grid 17 itself. By utilizing such a configuration, the sea water may be supplied in a generally spiral path similar to that along which the product water is removed thereby substantially increasing the contact path length of the sea water with the surface of the membranes, and increasing the separation efficiency of the module.

However, in the usual mode of operation, the separator grid 17 provides a spiral passageway through which water to be purified is conducted in a direction parallel to the axis of the tube 15 and at right angles to the direction of flow of product water. But, for most purposes it is satisfactory to employ an uncrimped material having a grid-like structure, such as woven screen, as the separator grid material.

As illustrated in FIGURES 1 and 2, the tube 15 is substantially hollow, and is provided with a plurality of axially aligned slits or holes 32 on its outer circumference. The unsealed edge or apex 26d of the envelope 16 is bonded to the tube 15 to provide fluid-tight connection to the tube and to provide fluid communication between the holes 32 and the interior of the envelope 16. Thus, as shown in FIGURE 3, the first semi-permeable membrane 18 is bonded to the tube adjacent one side of the axially aligned holes 32, with the second semi-permeable membrane 20 being bonded to the tube adjacent the other side of the axially aligned holes 32. Obviously, the membrane 18 must also be bonded to the tube along a portion 26a' of its edge 26a and along a portion 26c' of its edge 26c to provide fluid-tight communication. There is thereby provided means for fluid communication between the interior of the envelope 16 and the hollow interior of the tube 15 through the holes 32. The tube 15 is sealed at its upper end by a plug 38 secured therein, so that fluid conducted into its central portion is directed downwardly to its lower end.

In obtaining bonds sufficiently strong to withstand the pressures contemplated herein, and if cellulose acetate is utilized as the membrane material, the adhesive employed for bonding together the edges 26a, 26b and 26c of the envelope, and edge 26d to the central tube 15 desirably is modified epoxy resin. A preferred resin adhesive of this type is a mixture of Gen-Epoxy 177 and Versamid 140 in a 30 to 70 proportion by weight. Such an adhesive is generally compatible with the materials used and adequately wets them, forming a strong bond after curing is completed.

The casing 11 preferably is fabricated from copper or other corrosion-resistant material such as polyvinyl chloride. It comprises a cylindrical shell 39 having a cap 40 secured to its upper end and a flange 41 secured to its lower end. The cap and flange are secured to the shell by brazing, welding, or the like. There are provided a feed inlet pipe 42 disposed centrally in the cap 40, and a waste outlet pipe 44 disposed in the shell 39 adjacent the flange 41.

Secured to the inside of the shell 39 adjacent its upper end is a collar 45 having an inwardly-extending shoulder. A ring 46 is provided which is fitted over the upper end of the membrane module 10 and which seats against the outer layers of the envelope 16 and separator grid 17. A gasket 47, which preferably comprises an O-ring is disposed between the collar 45 and the ring 46 when the membrane module 10 is in operating position within the casing 11, and is compressed therebetween to provide a substantially fluid-tight seal. The purification unit 9 is thereby divided into a feed compartment 54 and a purification compartment 58. Water to be purified (supplied through inlet pipe 42) is thereby directed from the feed compartment 54 downwardly through the passageways of the separator grid 17 in the purification compartment.

As particularly shown in FIGURE 1, the purification unit 9 further comprises a product water takeoff assembly 12. The assembly 12 generally includes a flange 60 having a nipple 61 disposed on its interior surface and a product water outlet pipe 62 on its exterior side, connected to the nipple 61. A connector 63, such as a piece of rubber tubing, is disposed over the outwardly extending end of the nipple 61. The connector 63 is also disposed over the open end of the tube 15. Thus, fluid communication is provided between the interior of tube 15 and the product water outlet pipe 62. In addition, suitable bolts 64 are provided to secure the flange 60 to the corresponding flange 41 on the casing 11. As shown, a gasket 66 is disposed intermediate the flanges 60 and 41 to provide a fluid-tight seal.

While the previously described apparatus may be utilized to treat various solutions, it is particularly adapted for treatment of saline solutions such as sea water and its operation will accordingly be described in terms thereof. In describing such treatment, reference will be made to arrows shown in FIGURE 1 which depict directions of flow. In operation, sea water is supplied to the feed compartment 54 through the feed inlet pipe 42 from which it flows downwardly through the purification compartment 58, specifically through the passageways in the membrane module 10 defined by the spiral windings of the separator grid 17. After passage therethrough, the sea water, which has been depleted of a portion of its original water content, is discharged from the purification unit through the waste outlet 44. The material discharged from the waste outlet 44 will hereinafter be referred to as "sea water residue."

Throughout its residence time in the purification unit 9, the sea water is maintained at a pressure sufficient to cause reverse osmosis to occur, i.e., to cause diffusion of pure water from the sea water through the semi-permeable membranes 18 and 20. This may efficiently be achieved by employing a suitable pump (not illustrated) for supplying sea water to the purification unit 9 and disposing an appropriate pressure control valve (not illustrated) in the waste outlet pipe 44, thereby regulating the pressure of the sea water in the purification compartment 58. Preferably the pump provides a constant flow of sea water through the purification compartment 58, which constant flow is desirable for maintaining equilibrium salt concentration.

As previously indicated, substantially purified product water diffuses through the semi-permeable membranes 18 and 20 as the sea water flows downwardly through the passageway adjacent the membranes. This product water diffuses into the backing material 24. Upon reaching the backing material 24 the product water flows in a generally spiral path through the spirally wound backing material 24 until it reaches the end 26d of the envelope 16, bonded adjacent to the tube 15. At this point, the product water flows over the hollow interior of the tube 15 through the holes 32. Upon reaching the interior of the tube 15 the product water flows out through the open end of the tube, through the take-off assembly 12, and through the product water outlet pipe 62. Preferably, the membrane assembly 9 including the tube 15 is disposed in a vertical position so that desalinated water flows out through the open end of the tube 15 by gravity.

As the product water flows spirally through the backing material 24 as described above, it experiences a drop in pressure from the point where it initially emerges from the semi-permeable membranes 18 and 20 to the point where it reaches the tube 15. When the volumetric flow per unit area of the membrane is substantially constant, this pressure drop is proportional to the distance the water flows, and is inversely proportional to the square of the effective hydraulic diameter of the pores in the backing material 24. Accordingly, to minimize pressure drop, the material 24 should have large-sized pores. However, since the backing material also serves to support the membranes 18 and 20, the pores should not be so large that the membranes are forced into and through the pores. At the same time, it is desirable to employ a membrane module having relatively large membrane area, and hence having a maximum membrane length.

In order to achieve the foregoing objectives, the alternate membrane module embodiment illustrated in FIGURES 4 and 5 may be utilized. In that embodiment, in order to maintain the pressure drop within a reasonable value, preferably about 10 percent of the net driving pressure across the membranes 18' and 20', a plurality of drain tubes 70 are provided. (Elements corresponding to elements previously described in connection with FIGURES 1, 2 and 3 are identified by the same reference numerals with a prime (') symbol.) The drain tubes 70 are disposed in contact with the backing material 24' within the membrane module 10'. These drain tubes 70 are normally provided with a plurality of slots 74 along their outer circumferential surface. Thus, portions of the purified water are drained through the drain tubes 70 as the product water flows through the backing material 24' to the central tube 15'. Preferably the drain tubes 70 are fabricated of cellulose butyrate, and are sealed at their upper end.

As shown in FIGURE 5, a manifold 76 is employed to conduct purified water from the drain tubes 70 and the central tube 15' into the product water take off assembly 12'. The open ends of the drain tubes 70 are bent and passed through a coupling 78 which has a generally cylindrical exterior and a generally conically-shaped interior. The tubes 70 are disposed within the coupling 78 so that their open ends are adjacent to the outlet end of the coupling, and the central tube 15' is also disposed in the coupling. Epoxy resin is then poured into the coupling 78 and around the tubes 70 and 15' and cured to provide a sealant and plug. The coupling 78 is then connected to the rubber tube 63 in the same manner as described in the embodiment of FIGURE 1.

It is ordinarily preferable to employ a plurality of the purification units suitably interconnected with the pump means at their respective inlet pipes and with appropriate header connections at their respective outlet pipes so as to form water desalination apparatus adaptable for producing substantial quantities of desalinated water on a commercial scale.

Preferably the membrane modules 10 which are to be employed are prefabricated, and the interconnections between the plurality of purification units comprising the plant are arranged so as to facilitate periodic shutdown of individual purification units, thereby permitting rapid replacement of the individual membrane modules. It is anticipated that eventual replacement of the individual membrane modules assemblies may be necessary due to the corrosive effects of saline solutions. Thus, the particular modular construction described, permitting rapid and economical replacement of the individual membrane modules, is particularly advantageous. The modular designed plant described herein will normally prove to be highly durable and adaptable for many uses. Maintenance costs are anticipated to be quite low when such a design is utilized since only a single purification unit is affected in case of membrane failure, for example, and a complete plant shutdown is not necessary for membrane module replacement. Also, the costs required for membrane module replacement would be minimal due to the use of prefabricated modules.

In a specific example of the practice of the present invention, a membrane module was prepared in which the membrane envelope comprised two 9 inch by 47 inch sheets of cellulose acetate. The cellulose acetate sheets were prepared from a solution of cellulose acetate (Eastman Chemical No. 398–3) in a mixture of water, acetone, and magnesium perchlorate. The sheets were made by depositing the solution on a rotating drum, from which a sheet having a thickness of about 100 microns was separated. That surface of the sheet which was away from the drum included a layer which was nonporous. The sheets were aligned such that their nonporous surfaces faced the feed water. This orientation is advantageous because it facilitates removal of salts from the surface exposed to the feed water.

The backing material of the envelope comprised two layers of a Dacron felt sold under the trade name Selmatex, which were separated by two layers of a woven nylon cloth sold under the trade designation P4X.

The separator grid of the membrane module comprised polyethylene screening sold under the trade name Vexar.

The semi-permeable membranes were bonded together, and the envelope was bonded to the center tube, with an adhesive comprising a mixture of epoxy resins sold under the trade names Gen-Epoxy 177 and Versamid 140 in the proportions 30:70 by weight.

The center tube comprised a cellulose butyrate tube having an outside diameter of 5/8 inch and a wall thickness of 1/8 inch. The tube was sealed at its upper end, and holes were provided at 3/8 inch intervals along the length of the tube, the diameter of the holes being 0.013 inch.

The membrane module was disposed in a casing fabricated from copper. Feed water to the purification unit comprised tap water having a conductance of 865 micromhos per centimeter, which was equivalent to a dissolved solids content of 700 p.p.m. This water was supplied to the feed compartment of the purification unit at a pressure of 103 p.s.i.a. and at a temperature of 79° F.

Purified water was recovered from the product water take off tube at a rate of 47 milliliters per minute, and feed water residue was discharged from the waste outlet pipe at a flow rate of 47 milliliters per minute.

The purified water thereby recovered had a concentration of 38 micromhos per centimeter, corresponding to a dissolved solids concentration of approximately 30 p.p.m.

Thus there has been provided an improved method and apparatus for the recovery of purified water from brackish water or sea water with desirable economy of operation, and maintenance.

As previously indicated, the present apparatus and process may be readily adapted for concentrating a particular aqueous solution as well as producing purified water. In this connection it would merely be necessary to provide means for collecting or receiving the more concentrated solution previously designated as the sea water residue. The purified water would then be the waste product and could either be collected and used or disposed of, while the more concentrated solution from which the purified water has been removed would remain as the desired product. Such an apparatus has been constructed and successfully tested.

The membranes employed in concentrating contained about two square feet of surface exposed to the aqueous solution. The aqueous feed solution supplied to the modules comprised distilled water which was saturated with calcium sulfate. The pressure applied to the feed solution varied from 98 to 102 p.s.i.g., and the temperature varied between 80° and 90° F. A substantial increase in the calcium sulfate content, generally at least 20%, occurred during passage through the module. Such increased content exceeded the saturation value, and resulted in precipitation of calcium sulfate crystals. It was found that precipitated crystals did not necessarily stick to the membrane surfaces so as to interfere with the rate of diffusion across the membrane.

It will be understood that various modifications and changes will be apparent to those skilled in the art from the foregoing description. Such modifications are deemed to be within the scope of the appended claim.

Various features of the present invention are set forth in the following claim.

I claim:

1. Apparatus for the recovery by reverse osmosis of a desired product from an aqueous solution, which apparatus comprises means defining a cylindrical chamber having a generally circular cross-section, a hollow mandrel disposed with its axis coaxial with the axis of said chamber, an elongated envelope of sheets of semipermeable membranes spaced apart from each other by a layer of porous backing material disposed therebetween, said membrane envelope being disposed in the annular region between said mandrel and the wall of said chamber and wound spirally about said mandrel therein, one continuous length of separator grid material disposed adjacent membrane surfaces exterior from said backing material by being spirally wound with said membrane envelope, one end of said envelope being open and said porous backing material being in communication with the interior of said hollow mandrel through said open end, means for supplying an aqueous feed solution to one end of said chamber to cause the feed solution to flow in a direction generally parallel to said axis of said chamber between the windings of said membrane envelope traveling in said separator grid material, gasket means disposed between the cylindrical inner sidewall of said chamber and the exterior surface of said spirally wound envelope and separator grid, means for discharging the nonpermeated solution from the opposite end of said chamber, means for discharging permeated water from the interior of said hollow mandrel, a plurality of tubes having porous sidewalls provided at locations within said membrane envelope at distances spirally outward from the mandrel, and means connecting said tubes to said permeated water discharge means, said tubes extending substantially across the width of said elongated envelope and providing a flow path directly to said permeated water discharge means.

References Cited

UNITED STATES PATENTS

| | | | |
|---|---|---|---|
| 2,599,604 | 6/1952 | Bauer et al. | 210—494 |
| 2,650,709 | 9/1953 | Rosenak et al. | 210—321 |
| 2,741,595 | 4/1956 | Juda | 210—321 X |
| 2,756,206 | 7/1956 | Gobel | 210—321 |
| 2,854,142 | 9/1958 | Baker | 210—342 X |
| 2,982,416 | 5/1961 | Bell | 210—321 |
| 3,171,808 | 3/1965 | Todd | 210—321 |
| 3,173,867 | 3/1965 | Michaels | 210—321 |
| 3,252,272 | 5/1966 | Hazen et al. | 55—158 |

FOREIGN PATENTS

| | | |
|---|---|---|
| 1,328,826 | 4/1963 | France. |
| 489,654 | 8/1938 | Great Britain. |

OTHER REFERENCES

Osburn, J. O. and Kammermeyer, K.: "New Diffusion Cell Design," Industrial and Engineering Chemistry, vol. 46, No. 4, pp. 739–742.

Kolff, W. J. and Watschinger, B.: "Further Development of a Coil Kidney," Journal of Laboratory and Clinical Medicine, vol. 47, No. 6, pp. 969–977.

SAMIH N. ZAHARNA, *Primary Examiner.*

REUBEN FRIEDMAN, *Examiner.*

W. S. BRADBURY, *Assistant Examiner.*